Figure 1:
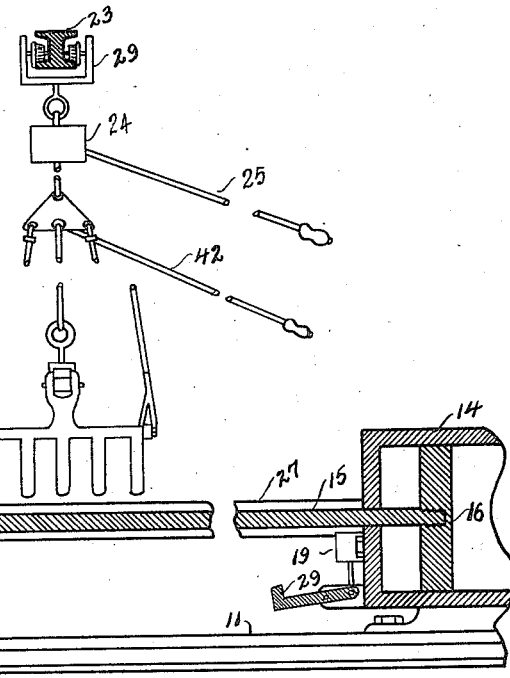

J. W. BROWN.
APPARATUS FOR FORCING BODIES FROM PLASTIC MATERIAL.
APPLICATION FILED AUG. 10, 1912.

1,193,507.

Patented Aug. 8, 1916.
5 SHEETS—SHEET 1.

WITNESSES
Andrew Broggini
Edwin W. Kronbach

INVENTOR
JOHN W. BROWN
BY Ira J. Adams
ATTORNEY

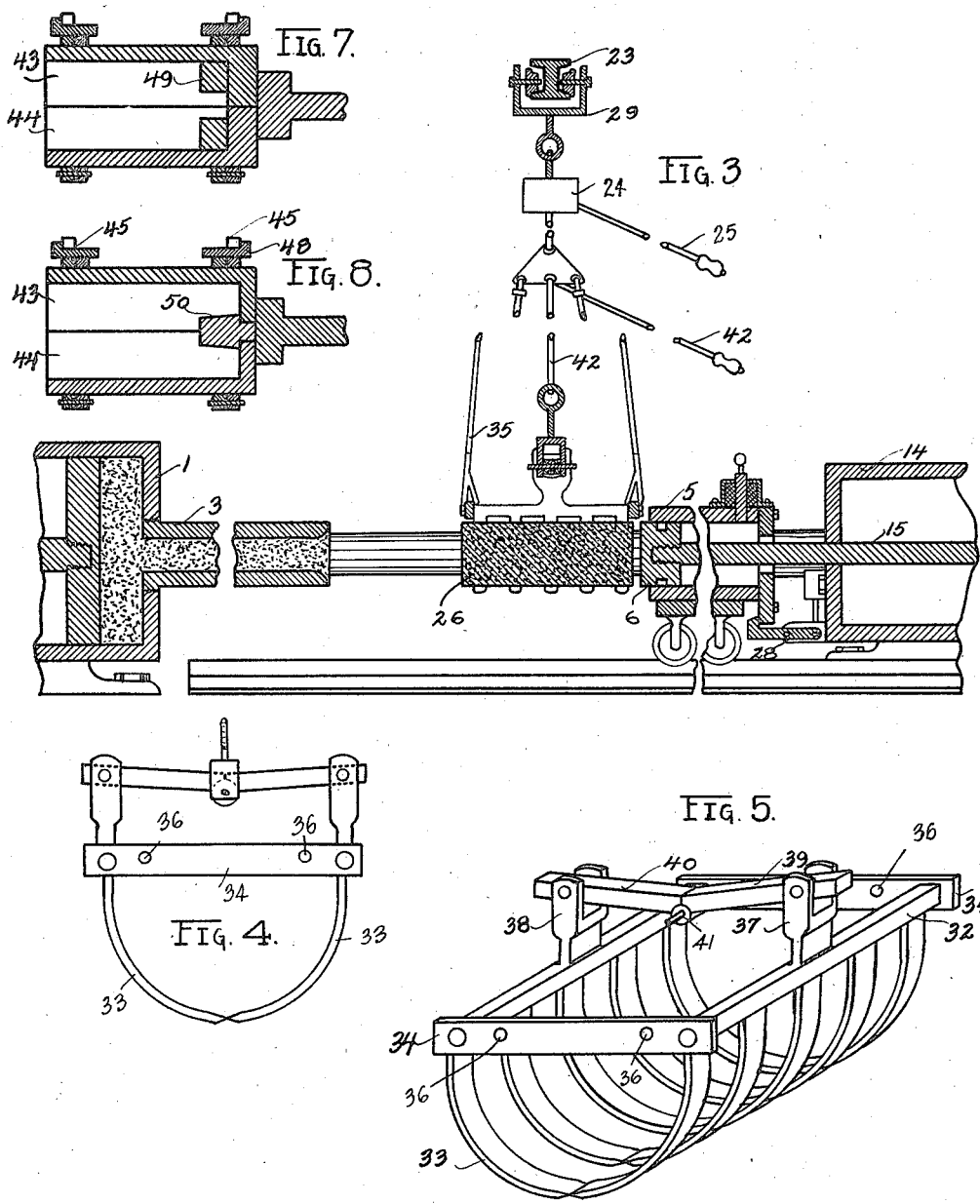

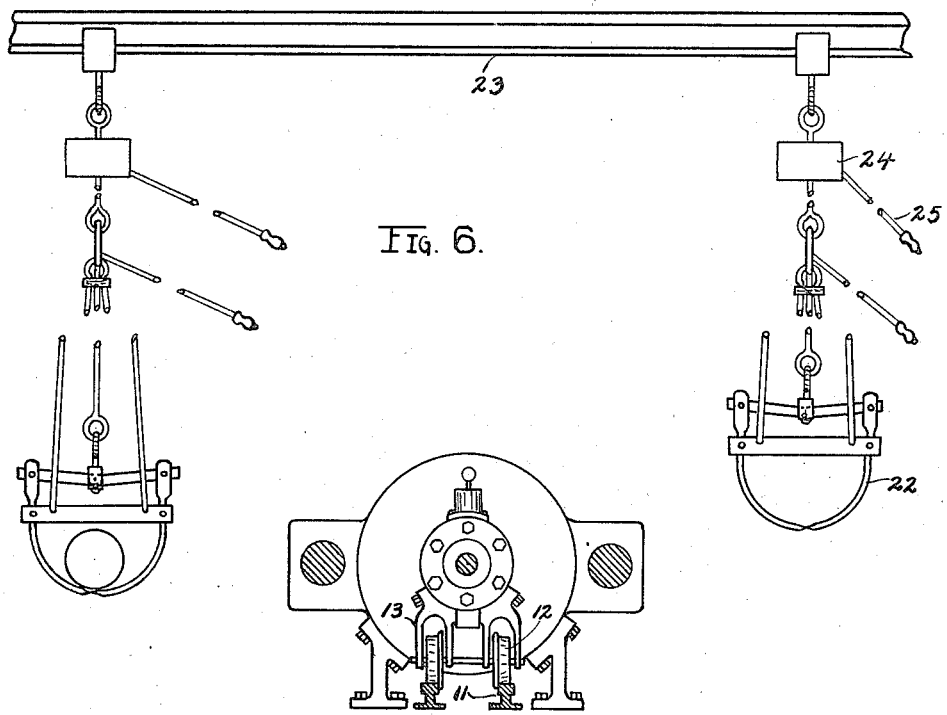

J. W. BROWN.
APPARATUS FOR FORCING BODIES FROM PLASTIC MATERIAL.
APPLICATION FILED AUG. 10, 1912.
1,193,507.
Patented Aug. 8, 1916.
5 SHEETS—SHEET 4.
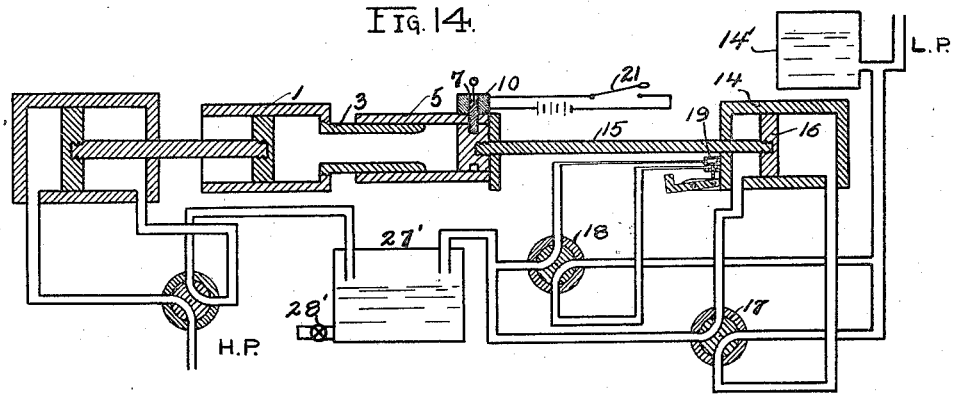
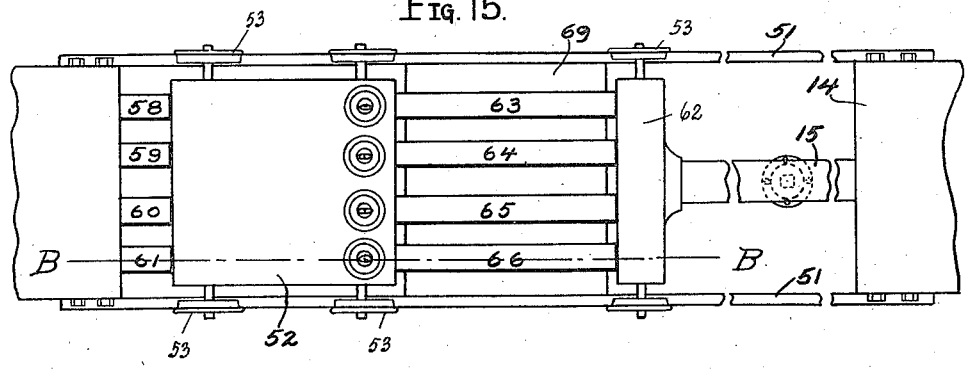
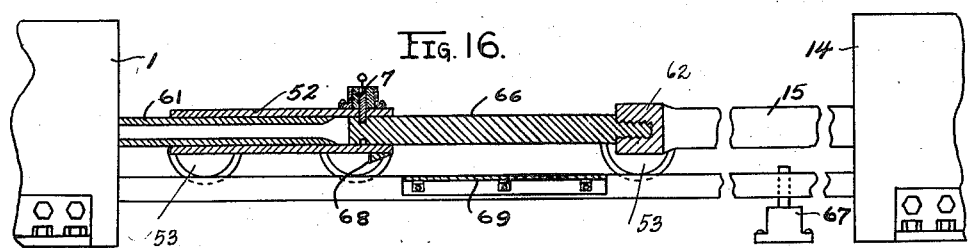
WITNESSES
INVENTOR
JOHN W. BROWN
BY
ATTORNEY

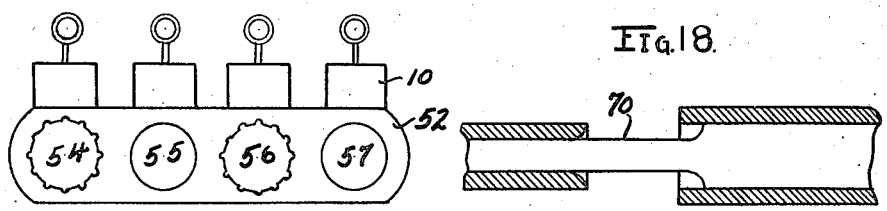
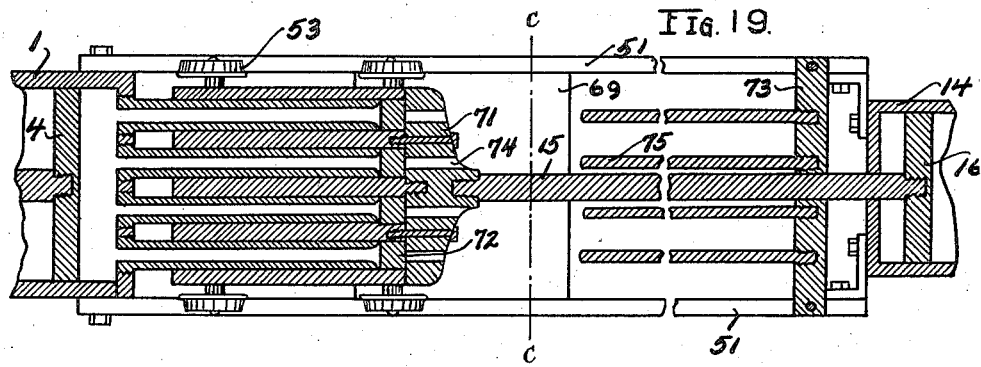
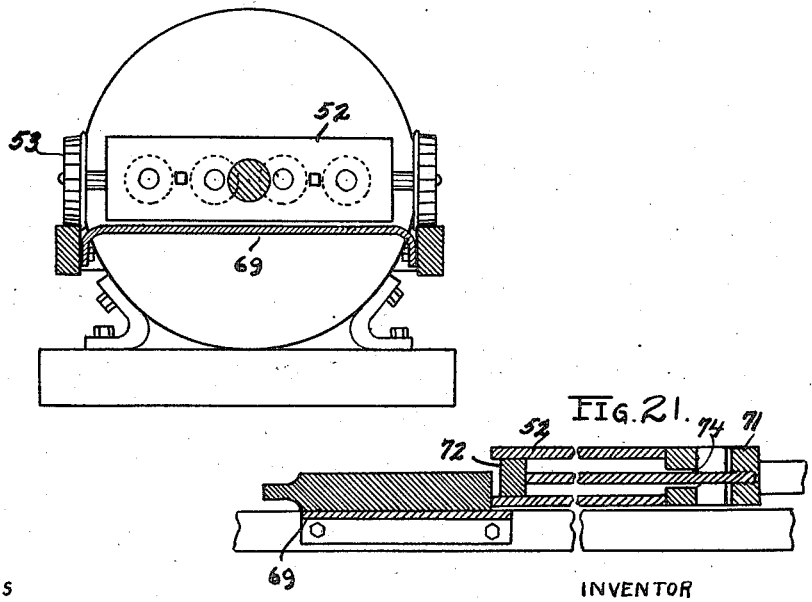

UNITED STATES PATENT OFFICE.

JOHN W. BROWN, OF LAKEWOOD, OHIO, ASSIGNOR TO NATIONAL CARBON COMPANY, OF CLEVELAND, OHIO, A CORPORATION OF NEW JERSEY.

APPARATUS FOR FORCING BODIES FROM PLASTIC MATERIAL.

1,193,507.   Specification of Letters Patent.   Patented Aug. 8, 1916.

Application filed August 10, 1912. Serial No. 714,333.

*To all whom it may concern:*

Be it known that I, JOHN W. BROWN, a citizen of the United States, and a resident of Lakewood, in the county of Cuyahoga, in the State of Ohio, have invented new and useful Improvements in the Apparatus for Forcing Bodies from Plastic Material, of which the following is a clear and exact description.

This invention relates to the manufacture of electrodes or other bodies from plastic materials.

The invention can be used for forming many kinds of articles, but for the purpose of explanation the specification is limited to the formation of electrodes. The claims, however, are not to be understood as being thus limited.

One object of the invention is to form electrodes of uniform density and free from cracks.

Another object is to provide means for carrying the forced electrodes to the furnace room for baking or to any place desired.

Another object is to provide for the forcing of a plurality of electrodes at the same time.

Other objects will appear in the appended description.

Small electrodes can be successfully forced through dies, but if the same method is used in forcing large ones the resulting product is not always satisfactory. In the center of the electrode there is considerably less resisting pressure than at the outside, and hence the inner portion will be less dense than the outer portion. The central portion flows faster than the outside shell and there is always the tendency to form a core with small cracks leading to the surface. There is therefore a limiting size of electrode for a mix of given plasticity that can be successfully forced through a die. The less plastic the mix is the larger the limiting size becomes. It is therefore evident that in order to force any and all sizes of electrodes means must be used to insure that all portions of the electrode must be of the same density, and to prevent any portion from moving out of the die at a different rate than any other portion. My invention is intended to accomplish these results.

If the die in the "mud" cylinder is prolonged to be of substantially the same length as the desired electrode or electrode section and a mold open at one end is fitted over it in such a position that the plastic material forces the mold off of the tubular die against a counter pressure, then all parts must flow at the same rate and all parts will be equally compressed. The particular manner in which this is accomplished will now be described.

Figure 2:
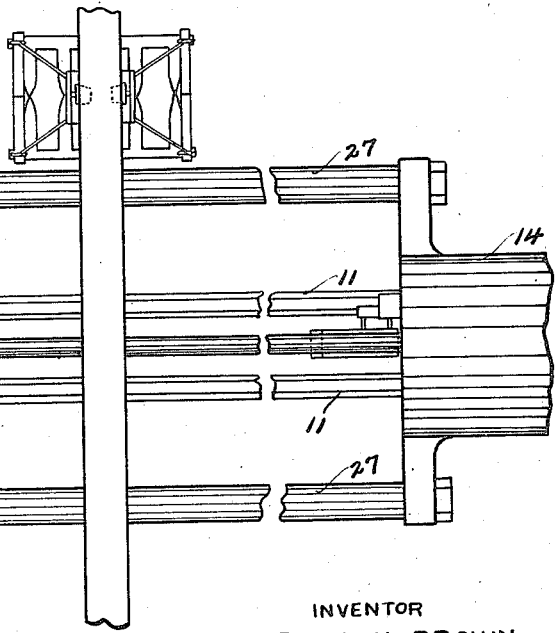

Referring to the drawings:—Figure 1 is a longitudinal section of parts of a "jumbo" press. Fig. 2 is a top view of the apparatus shown in Fig. 1. Fig. 3 is a view of the apparatus shown in Figs. 1 and 2, but with the parts in different operative position. Fig. 4 is an end view of a carrier means for handling the electrodes after they are forced. Fig. 5 is a pseudo perspective view of the carrier shown in Fig. 4. Fig. 6 is a sectional view taken on the line A—A of Fig. 1. Fig. 7 is a view of a modified mold with means for forming the male end of a sectional electrode. Fig. 8 is a view of a modified mold with means for forming the female end of a sectional electrode. Fig. 9 is a view of a mold similar to that shown in Fig. 1, but with means for forming the female end. Fig. 10 is a view of the mold shown in Fig. 9 but with means for forming the male end. Fig. 11 is a view of the clamping arms that hold together the separable electrode shown in Figs. 7 and 8, the arms being shown separated. Fig. 12 is a view of the clamping arms fastened together in operative position. Fig. 13 is a view of the key for holding the clamping arms together. Fig. 14 is a diagrammatic view of the hydraulic system used. Fig. 15 is a top view of a modification for simultaneously forcing a plurality of electrodes. Fig. 16 is a partial sectional view taken on the line B—B of Fig. 15. Fig. 17 is an end view of the mold shown in Figs. 15 and 16. Fig. 18 is a view of the mold and die in proper position for severing the forced material to form an electrode with a reduced end. Fig. 19 is a sectional view of a modification somewhat similar to that shown in Fig. 15. Fig. 20 is a sectional view taken on the line C—C of Fig. 19. Fig. 21 is a sectional view of certain parts of Fig. 19 with the electrode forced out of the mold.

Referring to Fig. 1, the "mud" cylinder 1 contains the plastic material 2 to be forced out through die 3 by means of the head 4.

The die 3 is in the shape of a tube and is surrounded by the mold 5. The mold is closed at one end by the head 6. The head, however, can be made free to slide in the mold by lifting the catch 7 which fits into the circumferential groove 8 in the head. The catch can be manually lifted by means of the handle 9 or by means of the electromagnet 10.

The mold 5 is movably supported on a track 11, by means of wheels 12 and brackets 13.

The head 6 in the mold 5 is connected to a hydraulic device 14 through piston rod 15. The pressure exerted against the head 6 through the piston rod is less than that exerted through the plastic material by means of the head 4 in the mud cylinder. For the purpose of description the pressure in the mud cylinder is called "high pressure" and the pressure in cylinder 14 is called "low pressure" though the relative pressures may be varied to suit individual cases. The difference in pressure may be obtained by varying the size of the two hydraulic rams or by varying the hydraulic pressures per square inch. The effect would be the same in either case. The air reservoir 14' is connected to the low pressure system so that the piston head 16 can retreat against a constant opposing pressure.

Referring to Figs. 1 and 14, when the mold 5 is forced off the die 3 a small distance the pressures are shut off and the electrode is severed by means of a saw or hot wire. The mold is then drawn to the right by admitting pressure to the left side of head 16 by manipulating valve 17. The valve is then thrown to cut off pressure from both sides of the head 16 and valve 18 is turned to admit pressure to the top of cylinder 19. This throws the catch 29 up to engage the lug 20 on the mold 5. The catch 7 is then raised either manually or by closing the switch 21 to energize the magnet 10. The mold is now held stationary and the head 6 is free to slide therein.

Before pushing the electrode out of the mold 5 the carrier 22 is drawn along the overhead track 23 either manually or by any other means till it is directly above the center line of the apparatus. The carrier can be lowered by any means such as an electric motor 24 controlled by a pull cord 25. When the carrier is in position, the valve 17 is turned to admit pressure to the left side of head 16 in cylinder 14 and the electrode 26 is forced out of the mold (Fig. 3) into the carrier. The carrier is then raised to clear the rods 27 and the electrode can then be carried to the furnace room and lowered into the furnace.

The tank 27 (Fig. 14) receives the exhaust fluid and this may be drawn off through pipe 28' to be utilized again.

After the electrode is pushed out of the mold the pressure is reversed in cylinder 14 and the head 6 drawn back into position. The catch 7 is lowered into position and the pressure in cylinders 14 and 19 is reversed. The catch 29 is then lowered and the mold is moved back over the tubular die 3 and the cycle is repeated to form another electrode.

In the manufacture of large electrodes it is desirable to remove the forced electrodes with despatch to the furnace room. This may be done in different ways, but as a typical example overhead cranes are shown on the drawing. The track 23 may extend to the furnace room and the cranes may be of any type, but for illustrative purposes a simple hoist is shown on the drawings. The hoist is supported on a track 23 by means of a trolley 29. The carrier may be raised and lowered by the electric motor which is diagrammatically represented at 24. Such motor hoists are old and well known in the art and hence a detail showing in this case would be superfluous. The motor controller is operated through the control cord 25.

In Figs. 4 and 5 the carrier is shown in detail. The members 32 which carry the arms 33 are pivoted in the bars 34. The suspended cables 35 are secured to the carrier in holes 36 in the bars. The members 32 each have an extension 37, 38 in which are pivoted two trips 39, 40. The trips are pivoted together at 41 so that when the central pivot point is below the center line the shoulders on the trips abut against each other to prevent the member 32 from turning. To the trips is fastened a cord 42 by which they may be raised above the center line. When this is done the carrier opens under the weight of the electrode and the latter is dumped. The weight of the connected parts of the carrier is such that they will assume automatically the position shown in Fig. 5 when the electrode is dumped and the cord is released. No claim is made to the particular type of carrier as this may be of any well known construction.

In Figs. 7 and 8 a modified mold is shown. The mold is cylindrical and divided into two parts 43, 44 held together by clamps 45 shown in detail in Figs. 11 and 12. The clamps consist of two pivoted arms 46 shaped to surround the mold when in locking position. The arms have lugs 47 on the upper overlapping end which receive a key 48 to lock them in position as shown in Fig. 8. With a mold of this type it is not necessary to push the electrode out of the mold by means of the low pressure ram. When the mold has been forced off the die 3 far enough to permit the severing of the electrode as previously described, the clamps 45 are removed and the top half of the mold taken off. The electrode can then be removed by hand or otherwise. The mold can then be clamped together again and pushed over the die to complete another operation. In all cases the fit of the mold over the die, and the joints, are loose enough so that the inclosed air can find means of escape when the mold is pushed over the die.

In Fig. 7 a die 49 is shown in one end of the mold to form the male end of a connection for securing electrode sections in a well known manner.

In Fig. 8 a plug 50 is shown in one end of the mold to form a female connection in the electrode. It is not possible to use dies at both ends of the mold, but the preferable arrangement would be to use the plug 50 at one end and to draw out the other end as shown in Fig. 18 to form the male connection. Of course, it will be understood that the male and female ends will be machined and threaded so that the section can be joined together. Even though the electrode were forced with a connection only at one end the work necessary for machining the ends would be reduced.

In Figs. 9 and 10 the head 6 has a plug and a die for forming a female and a male connection respectively. By these means either form of connection can be made at the rear end of the electrode. In these figures the type of mold is that shown in Fig. 1.

In some cases it is desirable to force a plurality of electrodes. This is especially true with battery electrodes. In Figs. 15 and 16 a modification is shown whereby this may be done. A "mud" cylinder 1 is joined to a low pressure cylinder by heavy bars 51 on which is supported the mold 52 by means of wheels 53. The mold has a plurality of openings 54, 55, 56 and 57 that fit over corresponding die tubes 58, 59, 60 and 61. The openings 54 and 56 are shown corrugated to form ridges on the battery electrodes well known in the art. If these corrugations are not large the material will not squeeze out through them, but if large corrugations are desired, the dies may be made with ridges to fit the corrugations in the mold openings. The openings may, of course, be made of any desired shape.

The low pressure piston 15 is joined to a head 62 having a plurality of piston rods 63, 64, 65 and 66 fitting in the openings of the mold 52. The piston rods are locked to the mold by catches 7 as in Fig. 1.

The operation of this modification is as follows: The high pressure is exerted on the head in the mud cylinder 1 and the low pressure in the cylinder 14. The pressure of the mix forced through into the mold openings forces the mold and piston rod 15 to recede against the counter pressure in the cylinder 14. When the mold has cleared the dies a slight distance the electrodes are cut off as previously described and the mold is drawn back and locked by the hydraulic catch 67 which engages a lug 68 on the mold. The catch 7 is then lifted and the pressure reversed in the cylinder 14 to push the electrodes out on the table 69. The operation of the hydraulic mechanism of this modification is substantially the same as that in Figs. 1 and 14 and further description would be superfluous.

The electrodes may be forced as shown in Fig. 18 before being severed so as to form a reduced end 70 to extend through the top of the battery in the well known way. To do this with a small opening in the dies may necessitate that the pressure be reversed in the cylinder 14 to prevent the neck 70 from buckling. The pressure would, of course, not be reversed until the mold has nearly cleared the dies.

In Fig. 19 a modification is shown for forcing a plurality of articles. The mold 52 in this case is fastened directly to a head 71 which is connected to piston rod 15. In the openings in the mold are placed blocks 72 that can slide therein. Holes 74 of less size than the openings in the mold extend through the head 71 and communicate with each mold cavity, or opening. A bar 73 is fastened to the members 51 and has rods 75 adapted to extend through the holes 74 in the head 71 when it is drawn back.

The operation of this modification is as follows: The high pressure forces the mix through the dies into the mold and causes the mold and piston rod to recede against the counter pressure in cylinder 14. When the mold has cleared the dies the pressures are cut off and the electrodes severed. The mold is then drawn back by reversing the pressure in cylinder 14. The rods 75 extending through the holes 74 abut against the blocks 72 and the mold is drawn off of the electrodes, which drop down on the receiving table as shown in Fig. 1. The electrodes may then be removed by hand or otherwise and the operation repeated. When the mold is forced over the dies the blocks 72 will be pushed back into position.

The apparatus shown in Figs. 15 to 21 may also be used for making dynamo brushes or other articles.

Having described my invention what I claim is:

1. In a molding apparatus, a cylinder adapted to contain a mix, means for applying pressure to the mix in said cylinder, a die secured to the cylinder adapted to further compress the mix when forced therethrough by said pressure means, a mold slidingly fitted over the die, and means adapted to retard the movement of the mold as the mix is forced therein.

2. In a molding apparatus, a cylinder adapted to contain a mix, a die secured to the cylinder, a mold fitting over the die, means for forcing the mix through the die whereby it is compressed therein and forced into the mold and means adapted to retard the movement of the mold as the mix is forced therein and force the molded article from the mold.

3. In an apparatus for molding electrodes from a plastic material, a cylinder, a piston head in the cylinder, a relatively long hollow die secured to the cylinder adapted to compress the plastic material when forced therethrough by said piston, and an incasing mold closely fitting the die and adapted to move relatively thereto.

4. In an apparatus for molding electrodes from a plastic material, a mud cylinder, a relatively long die secured in the end of the cylinder, a piston head in the cylinder, adapted to force the plastic material through the die to compress it to a solid compact mass therein, and an incasing mold closely fitting the die and adapted to move longitudinally thereon whereby the electrode can be formed with a reduced end when said mold is moved beyond the end of the die.

5. In a molding apparatus for electrodes, a mud cylinder, a die attached thereto, having an enlarged orifice, and a mold slidingly incasing the die.

6. In a molding apparatus for electrodes, a mud cylinder, a die attached thereto having an enlarged orifice, a mold slidingly incasing the die, a piston in the cylinder for forcing the mix through the die to fill the mold and to produce a projecting portion having the form of the enlarged orifice.

7. In apparatus for molding articles from a plastic material, a mud cylinder, a die attached thereto having an enlarged orifice, a piston in the cylinder for forcing the plastic material through the die, a mold adapted to fit over the die and move longitudinally thereon, whereby a projecting portion having the form of the enlarged orifice is produced when said mold is moved beyond the orifice.

8. In a molding apparatus, a cylinder adapted to contain a mix, a die secured to the cylinder, a mold slidingly mounted over the die, a piston head in one end of the mold, a catch for securing the piston head to the mold, a second catch to lock the mold, means to operate the first mentioned catch to unlock the piston head and means whereby force may be applied to the piston head to move it through the mold to push out the molded article.

9. In a molding apparatus, a cylinder adapted to contain a mix, a die secured to the cylinder, a mold slidingly mounted over the die, a piston head in one end of the mold, a catch for securing the piston head to the mold, means for forcing the mix through the die into the mold, means for retarding the movement of the mold as the mix is forced therein, a catch to lock the mold, means to operate the first mentioned catch to unlock the piston head whereby force may be applied to the piston head to move it through the mold to push out the molded article.

10. In a molding apparatus, a cylinder adapted to contain a mix, a die secured to the cylinder, a mold slidingly mounted over the die, a piston head in one end of the mold, means for forcing the mix through the die into the mold, means for retarding the movement of the piston head and the mold as the mix is forced therein and locking means whereby the piston head and mold may move relative to each other to push out the molded article.

11. In apparatus for molding an electrode, a cylinder adapted to contain a mix, a die secured thereto, a mold slidingly mounted over the die, a piston in said mold having means in one end to shape the end of the molded electrode for a mortise and tenon joint and means for operating said piston to force the molded article from the mold.

12. In apparatus for molding an electrode, a cylinder containing a mix, a die secured thereto having an enlarged orifice adapted to shape one end of the electrode, a mold slidingly mounted over the die having means to shape the other end of the electrode for a mortise and tenon joint, and means to force the mix through the die into the mold.

13. In an apparatus for molding an electrode, a cylinder containing a mix, a die secured thereto, a mold slidingly mounted over the die, a piston in the mold, means secured to the piston to form a shaped end on the electrode, and means to force the mix through the die into the mold.

14. In an apparatus for molding an electrode, a cylinder adapted to contain a mix, a die secured thereto, a mold slidingly mounted over the die, a piston in the mold and a projection secured to the piston to form a hollow end on the molded electrode.

15. In an apparatus for molding electrodes, a mud cylinder, a die attached thereto, having an enlarged orifice, a mold adapted to fit over the die, a piston in the cylinder for forcing the mix through the die to fill the mold and produce a portion having the form of the enlarged orifice, a piston in the mold, and means secured to the piston to form a hollow end on the electrode.

In testimony whereof I have hereunto signed my name in the presence of two witnesses.

JOHN W. BROWN.

Witnesses:
CHARLES W. HILL,
GEORGE H. BROWN.